(12) United States Patent
Endoh et al.

(10) Patent No.: US 6,889,112 B2
(45) Date of Patent: May 3, 2005

(54) METHOD FOR PROCESSING SURFACE AND APPARATUS FOR PROCESSING SAME

(75) Inventors: Hiroyuki Endoh, Tokyo (JP); Eiri Sagae, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 10/102,630

(22) Filed: Mar. 22, 2002

(65) Prior Publication Data

US 2002/0147522 A1 Oct. 10, 2002

(30) Foreign Application Priority Data

Mar. 23, 2001 (JP) .................................. 2001-085411
Sep. 4, 2001 (JP) .................................. 2001-267941

(51) Int. Cl.$^7$ .................................................. G06F 19/00
(52) U.S. Cl. .................. 700/164; 700/156; 700/166; 700/121
(58) Field of Search ........................ 700/156, 164, 700/166

(56) References Cited

U.S. PATENT DOCUMENTS

| | | | | |
|---|---|---|---|---|
| 4,733,502 A | * | 3/1988 | Braun | 451/42 |
| 5,097,119 A | * | 3/1992 | Breitmeier | 250/201.4 |
| 5,291,415 A | * | 3/1994 | Zarowin et al. | 700/188 |
| 5,312,320 A | * | 5/1994 | L'Esperance, Jr. | 606/5 |
| 6,301,009 B1 | * | 10/2001 | Tinker | 356/511 |

FOREIGN PATENT DOCUMENTS

| | | | | |
|---|---|---|---|---|
| JP | 6-170763 | 6/1994 | | |
| JP | 7-68456 | 3/1995 | | |
| JP | 11-245152 | 9/1999 | | |
| JP | 2002224954 | * | 8/2002 | B24B/49/18 |

OTHER PUBLICATIONS

"Acquiring Simple Patterns For Surface Inspection"—Nurre et al, University of Cincinnati, IEEE 1988.*

* cited by examiner

Primary Examiner—Leo Picard
Assistant Examiner—Michael D. Masinick
(74) Attorney, Agent, or Firm—Oblon, Spivak, McClelland, Maier & Neustadt, P.C.

(57) ABSTRACT

A method for processing a surface corrects a relationship between a processing condition and a removal quantity (polished removal quantity) or a removal depth (polished removal depth) in accordance with a worked surface to obtain desired removal quantity or removal depth in processing the worked surface irrespective of the shape of the worked surface, forms a reference surface in a simple shape to obtain the relationship between the processing condition and the removal quantity or the removal depth readily, and executes such correction of the relationship between the processing condition and the removal quantity or the removal depth and such correction of unit removal shapes readily for a short time.

25 Claims, 11 Drawing Sheets

PROCESSED SURFACE SHAPE
DESIGNED SHAPE

CORRECTED UNIT REMOVAL SHAPE
CORRECTED QUANTITY
HEIGHT nm
UNIT REMOVAL SHAPE
CORRECTED QUANTITY
PROCESSED SURFACE SHAPE
WIDTH nm

CORRECTION OF UNIT REMOVAL SHAPE

SUPERPOSITION OF CORRECTED UNIT REMOVAL SHAPE

SUPERPOSITION OF UNCORRECTED UNIT REMOVAL SHAPE

ACTUAL REMOVAL DEPTH WITH RESPECT TO TARGET REMOVAL DEPTH UNDER CERTAIN PROCESSING CONDITION

UNIT REMOVAL SHAPE    SUPERPOSED SHAPE

SUPERPOSITION

REMOVAL DEPTH=C × k × STAY PERIOD
C: CORRECTION COEFFICIENT
k: PROPORTIONAL COEFFICIENT

CORRECTION COEFFICIENT IN EACH CURVATURE

REMOVAL DEPTH=C × k × STAY PERIOD
C: CORRECTION COEFFICIENT
k: PROPORTIONAL COEFFICIENT

CORRECTION COEFFICIENT IN EACH CURVATURE

CORRECTION OF UNIT REMOVAL SHAPE

EMBODIMENT

EMBODIMENT

EMBODIMENT

METHOD FOR PROCESSING SURFACE AND APPARATUS FOR PROCESSING SAME

BACKGROUND OF THE INVENTION

1. Field of the Invention

The present invention relates to a precision processing technology of a surface, especially a curved surface, which is capable of processing an optical object or device including the curved surface and a metal mold for molding the optical device precisely and efficiently while reducing variations of the processing precision.

2. Description of the Prior Art

As conventional precision processing technologies for a curved surface of an optical device, for example, there are the ones described in the gazettes of Japanese Patent Laid-Open Nos. Hei 6 (1994)-170763, Hei 7 (1995)-68456 and Hei 11 (1999)-245152.

The technology described in the gazette of Japanese Patent Laid-Open No. Hei 6 (1994)-170763 is a polishing method capable of executing a polishing step while automatically creating a polishing orbit in the same apparatus. In the polishing method, a measuring tool is attached to the processing apparatus, a polishing area of a work is divided in two axial directions perpendicular to each other by an effective radius unit where a polishing tool contacts the work, and with thus obtained divisional lines taken as a polishing pattern, the polishing area is made to profile the pattern. Thus, impedance control is carried out so that force detected by a force sensor can be a set value to obtain a position and data of a curved surface in an intersection point of the divisional lines. Thereafter, the polishing tool is attached, and based on the above-described curved surface data, a polishing route is decided, and thus the polishing is carried out by the impedance control.

Moreover, the technology described in the gazette of Japanese Patent Laid-Open No. Hei 7 (1995)-68456 is a corrective polishing processing method capable of automating polishing processing for a high-precision metal mold, an aspheric lens and the like that is not axially symmetric and of enhancing precision thereof. In the corrective polishing processing method, a self-profile polishing apparatus and an automatic measuring apparatus are disposed on a principal axis head of a NC machine tool controlled by a control apparatus, and measurement and corrective polishing processing are performed for a surface of processed matter. Then, during the measurement, a moving tolerance and a thermal drift of the machine are corrected, an actual polished quantity per one path is monitored based on a result of the measurement, and the next polished quantity is estimated based on this actual polished quantity, and the next polishing number is set. Simultaneously, in order to prevent overshoot due to variations of the polished quantity, a correction coefficient is introduced.

Furthermore, the technology described in the gazette of Japanese Patent Laid-Open No. Hei 11 (1999)-245152 is a polishing apparatus for high-precision finish polishing for a surface shape of a surface of an optical use and for achieving higher efficiency of the polishing processing for a curved surface of an optical object. The polishing apparatus for polishing the curved surface of a work attached to a work support tool, includes: a polishing head provided with a polisher in a tip thereof, the polisher processing the optical curved surface of the work while rotating the same; a slider for pressing the polisher to a normal line direction to the curved surface, the slider having a polishing head disposed thereon; a motor rotating the polisher; a Z-axis mechanism unit for moving the polisher provided in the polishing head disposed in the slider so as to abut against or to be isolated from the curved surface of the work; and a non-contact displacement meter attached to the polishing head and moving together with the polishing head, wherein the curved surface is polished into a desired shape by the polisher while a distance between the curved surface and the non-contact displacement meter being measured in a state where the polisher abuts against the curved surface.

Incidentally, heretofore, as an article processed to have a curved surface, a mirror for X-rays has been processed highly precisely. A final processing step for the mirror is polishing. The mirror for X-rays has a relatively large curvature radius, which is nearly a plane. On the other hand, in the case where a free curved surface of an device in an optical field, a mold (or a piece of the mold) or the like is polished precisely, which has a curvature radius smaller than that of the mirror for X-rays, it has been found out that there occurs a problem of a large tolerance of an actual removal depth with respect to a target removal depth if the curvature radius is reduced (a value of the curvature is isolated from zero) as shown in FIG. 8. Note that, in FIG. 8, a curvature of a convex surface is represented as positive, and a curvature of a concave surface is represented as negative.

Moreover, particularly in a free curved surface in which a large change of the curvature radius such as a change from the convex surface to the concave surface is present, the above-described tolerance greatly affects the processing precision. Accordingly, it has been made apparent that some correction is required in response to the curvature radius. Heretofore, a relationship between the removal depth and the processing condition has been previously grasped, and the processing condition has been set with respect to the target removal depth. However, the relationship described above has not been corrected in response to the shape of the processed surface, and particularly, to the curvature radius.

The related art described in the foregoing gazette of Japanese Patent Laid-Open No. Hei 6 (1994)-170763 is an example of automatically creating the polishing orbit, where the correction for the shape has not been performed. Therefore, high-precision processing cannot be performed.

Moreover, in the high-precision processing according to the related art described in the foregoing gazette of Japanese Patent Laid-Open No. Hei 7(1995)-68456, steps of measuring the shape, polishing the surface, measuring the shape, polishing the surface . . . are iterated plural times, whereby desired precision is achieved taking a long time. Also in this example, the correction for the curvature radius is not performed.

Furthermore, the related art described in the foregoing gazette of Japanese Patent Laid-Open No. Hei 11(1999)-245152 is a method for correcting the position of the polishing head based on measurement data obtained while measuring the distance between the processed surface and the non-contact displacement meter moving together with the polishing head. In this method, since the processed surface is contaminated by cuttings, abrasive grains or the like, the measuring precision has limitations. Accordingly, the processing precision based on the measurement result also has limitations naturally.

As described above, each of the related prior arts has limitations in processing precision, and convergence of the processing precision also has limitations. Therefore, each of the related arts is still insufficient for realizing the high-precision processing while reducing the variations of the processing precision as much as possible.

SUMMARY OF THE INVENTION

An object of the present invention is to realize a processing technology capable of polishing a free curved surface of an optical device, a metal mold (metal piece) for molding the optical device or the like highly precisely irrespective of a size of the curvature radius of the free curved surface.

Another object of the present invention is to complete the finish polishing by performing one cycle of the steps of measuring the shape, polishing the surface and measuring the shape with regard to the high-precision polishing processing technology.

Still another object of the present invention is to realize a printing apparatus capable of high-speed and high-definition printing, on which an optical device molded by use of the metal mold for the optical device is mounted, the metal mold being obtained by the curved surface processing method and the curved surface processing apparatus of the present invention.

To accomplish the above objects, according to an aspect of the present invention, there is provided a method for processing a worked surface of a work piece, comprising steps of:

processing a reference surface of a same material as a material of the work piece prior to processing the worked surface;

obtaining a relationship between a processing condition and a removal quantity or removal depth of the material by the processing of the reference surface;

correcting the relationship between the processing condition and the removal quantity or removal depth in the reference surface in accordance with a shape of the worked surface; and processing the worked surface of the work piece by use of the condition.

For the objective matter for polishing processing, information in the polishing processing (information regarding such as the relationship between the processing condition and the removal quantity or the removal depth, which is obtained by processing the reference surface of the material as that of the processed surface) is obtained by actual processing. Based on the information, and the relationship between the processing condition and the removal quantity or the removal depth in the reference surface is corrected in accordance with the shape of the worked surface, then the load, the tool peripheral velocity and the like in the polishing processing are controlled. Thus, the worked surface can be finished in high curved surface precision in one polishing processing. Then, the control information is obtained for each processed matter different in shape, and the polishing control is performed similarly, thus making it possible to perform the polishing processing in similar precision irrespective of any shape of the polished worked surface.

The other objects, features and advantages of the present invention will be apparent from the following description made in connection with the accompanying drawings.

DESCRIPTION OF THE PREFERRED EMBODIMENTS

Next, description will be made for embodiments with reference to the drawings.

Figure 1:
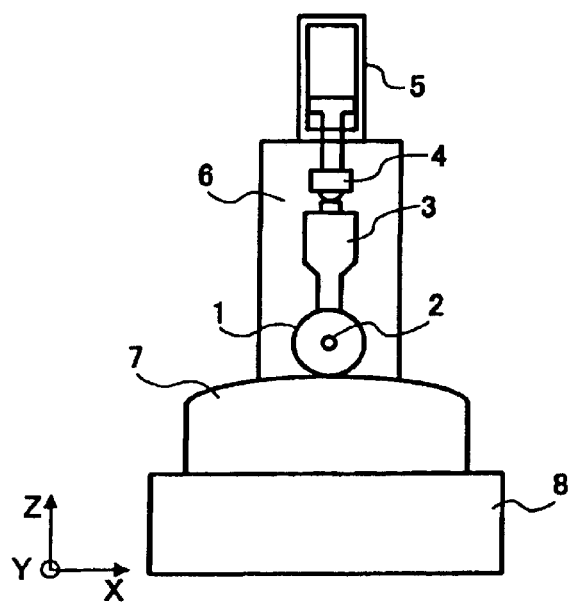
FIG. 1 is a front view schematically showing a whole of a processing apparatus of polishing processing for a curved surface.

As shown in FIG. 1, in a polishing processing apparatus used in the present invention, a tool 1 having a rotating tire shape or a rotating spherical shape or alternatively having a shape composed of a part of such shapes is fixed to a spindle which also serves as a direct moving slide. A specified load is given to the direct moving slide 3 by a load generating mechanism unit 5, and the load is transmitted to the tool 1 to generate a load (thrust force) between the tool 1 and a worked surface of a work piece 7 or processed matter. The load is detected by a load sensor 4, and the load generating mechanism unit 5 is controlled by an unillustrated control unit (for example, a personal computer) so that the load can reach a specified value. In FIG. 1, reference numeral 2 denotes a shaft of the tool, reference numeral 6 denotes a column. The work piece 7 or processed matter can be subjected to so-called normal line control, in which a normal line of the worked surface is made to coincide with a direction where the load from the tool is loaded by an X-axis, a Y-axis and Z-axis and movements of a A-axis and a B-axis, which are parallel to the X-axis and the Y-axis, respectively. When the worked surface is a plane, processing for the same as it is may be considered by this normal line control. On the other hand, when the worked surface is a curved surface, processing for a surface obtained by developing the curved surface to an approximate plane may be considered. Here, a reason why the "approximate plane" is mentioned is described as follows. Specifically, when the worked surface has a cylinder shape, the worked surface can be developed into a plane. However, when the worked surface has other shapes, the worked surface cannot be developed into a perfect plane, and the developed surface becomes an approximate plane. In this case, a degree of developing a plane should be examined and decided in accordance with a target precision.

A method for processing a worked surface of a work piece, according to the present invention comprises steps of processing a reference surface of a same material as a material of the work piece prior to processing the worked surface, obtaining a relationship between a processing condition and a removal quantity or removal depth of the material by the processing of the reference surface, correcting the relationship between the processing condition and the removal quantity or removal depth in the reference surface in accordance with a shape of the worked surface, and processing the worked surface of the work piece by use of the condition.

Figure 2:
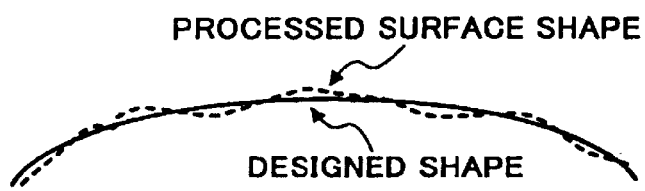
FIG. 2 is a schematic view inflatedly showing a tolerance between a desired designed shape and a measurement result of a shape of a worked surface before processing (concretely, before polishing).

As shown in FIG. 2, a tolerance exists between a desired designed shape of the worked surface and a measurement result of the shape thereof before processing (concretely, before polishing). Based on the tolerance, a removal quantity or a removal depth in each processing point is determined. Before processing the worked surface, a plane formed of the same material as that of this worked surface is processed, whereby a processing condition, for example the removal quantity or removal depth in the plane, is determined in advance, which is necessary. Regarding this determination, heretofore, the Preston rule represented by the following equation has been known.

$$\delta = k \times P \times V \times t$$

(δ: removal quantity, k: proportional constant, P: pressure, V: relative velocity of tool and processed point (tool peripheral velocity) and t: stay period).

In the present invention, δ may be regarded as a removal depth, and P may be regarded as the load described above. Specifically, k as a proportional constant will be obtained here, and there are the following two methods for obtaining the proportional constant k.

Figure 9:
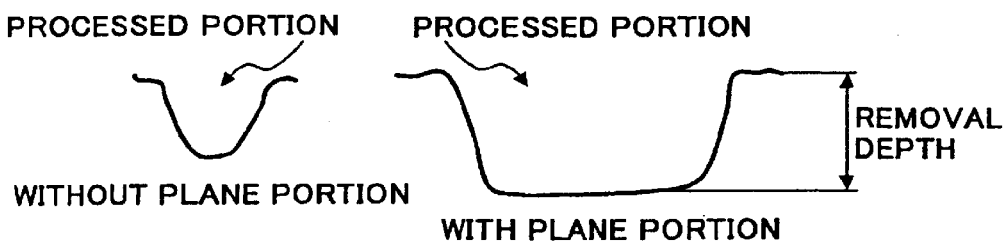
FIG. 9 is an enlarged view of a processed cross-section.
Figure 10:
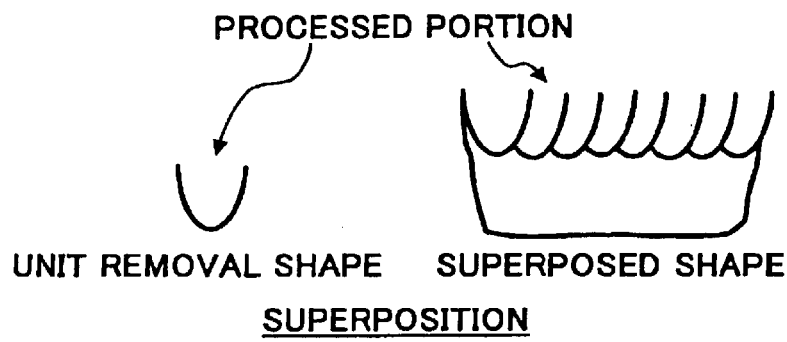
FIG. 10 is an enlarged view schematically showing a state where the unit removal shapes are superposed in a method for obtaining a removed quantity and a processing condition by superposing the unit removal shapes.

One is a method for obtaining the proportional constant based on the relationship between the removal depth and the processing condition, which is obtained when a sufficient area of a plane is processed with the processing conditions other than the load, the relative velocity and the stay period made constant. The other is a method for obtaining the removal quantity and the processing condition by superposing unit removal shapes, which are previously obtained as shapes obtained by processing the plane for a unit period, for example, one second, with the processing conditions other than the stay period made constant. Here, the above "sufficient area" implies an area sufficient for obtaining a plane portion in a removal shape by processing as shown in FIG. 9. Moreover, superposing the unit removal shapes is referred to as a state shown in FIG. 10.

Based on the removal depth, which is obtained as described above, the processing condition in each processed point is determined. Furthermore, in the present invention, the processing condition is corrected based on the desired shape of the worked surface.

Although what will be a reference here is the relationship between the processing condition and the removal quantity or depth in the plane, an object thereof is not limited to a plane, and the reference may be a relationship therebetween in a curved surface having a certain curvature radius.

(Embodiment 1)

Figure 3:
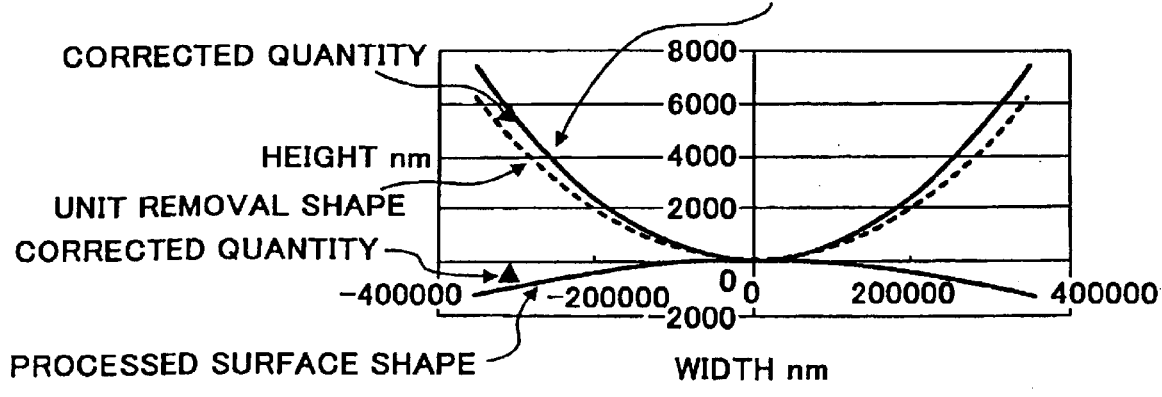
FIG. 3 is a graph showing correction of a unit removal shape in Embodiment 1.

When a convex spherical surface having a curvature radius of 50 mm is processed, a unit removal shape obtained by processing a plane, for example, a removal shape formed by thrusting a rotating tool against the plane for one second under a specified condition, is corrected to cope with the curvature radius of 50 mm. As shown in FIG. 3, the unit removal shape is disposed so as to abut by vertex against the convex spherical surface having the curvature radius of 50 mm, and the unit removal shape is deformed in the same direction as a vertical direction (normal direction) and by the same quantity as a moving quantity, the vertical direction and the moving quantity being observed when the convex spherical surface is developed into a plane. A result obtained by such deformation is shown in a graph of a unit removal shape after correction. An axis of ordinates indicates a depth of the removal shape, where a unit removal shape having a depth of about 6 μm is corrected to a unit removal shape having a depth of about 7 μm.

Figure 4:
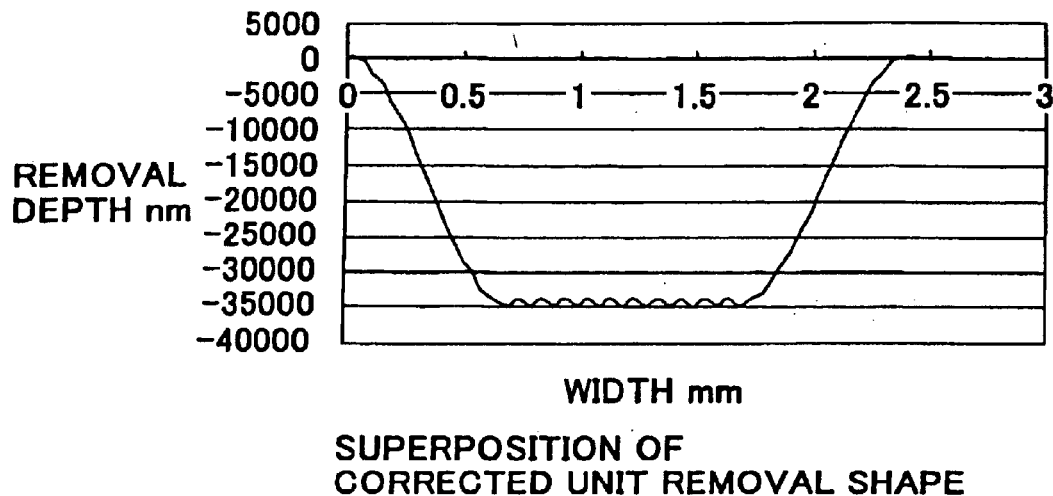
FIG. 4 is a graph where corrected unit removal shapes are superposed.
Figure 5:
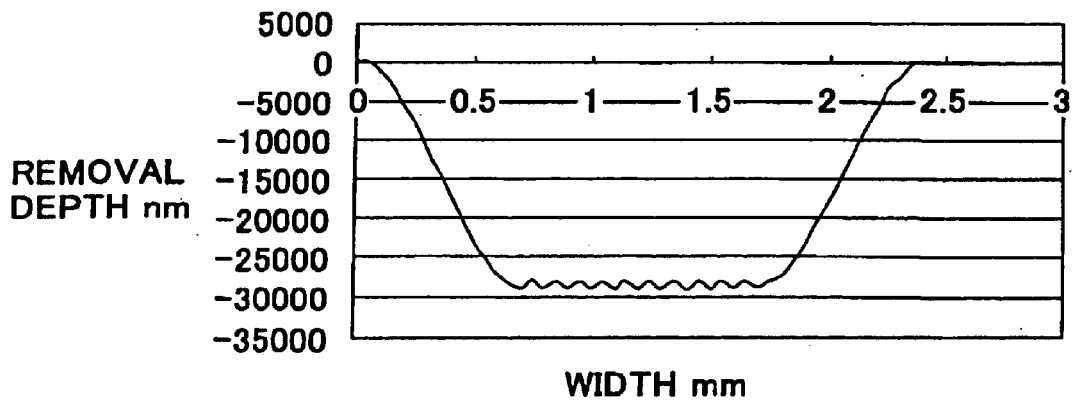
FIG. 5 is a graph where uncorrected unit removal shapes are superposed.

FIG. 4 shows a result of superposing the corrected unit removal shapes. The "superposing" mentioned here is arraying the corrected unit removal shapes in a specified interval and integrating the unit removal shapes. The value obtained by such integration will be a removal quantity by the polishing processing. FIG. 4 is illustrated two-dimensionally for simplification. However, from FIG. 4, it is apparent that the result of such superposition is about 35 μm. In order to obtain a removal quantity required for actual processing, for example, a stay period is set for a fundamental processing condition where the depth of about 35 μm is obtained, and thus the processing condition will be decided. The relationship between the removal depth and the stay period is previously obtained, and the stay period and the removal depth (removal quantity) are proportional to each other. Therefore, when the stay period is doubled, the removal depth will be 70 μm. FIG. 5 shows a result of superposing uncorrected unit removal shapes. In this case, the removal depth is about 28 μm, causing a tolerance of about 20% with respect to the removal depth under the fundamental processing condition. The unit removal shapes are corrected in response to the curvature radius of the worked surface, thus making it possible to decrease the tolerance.

Figure 14:
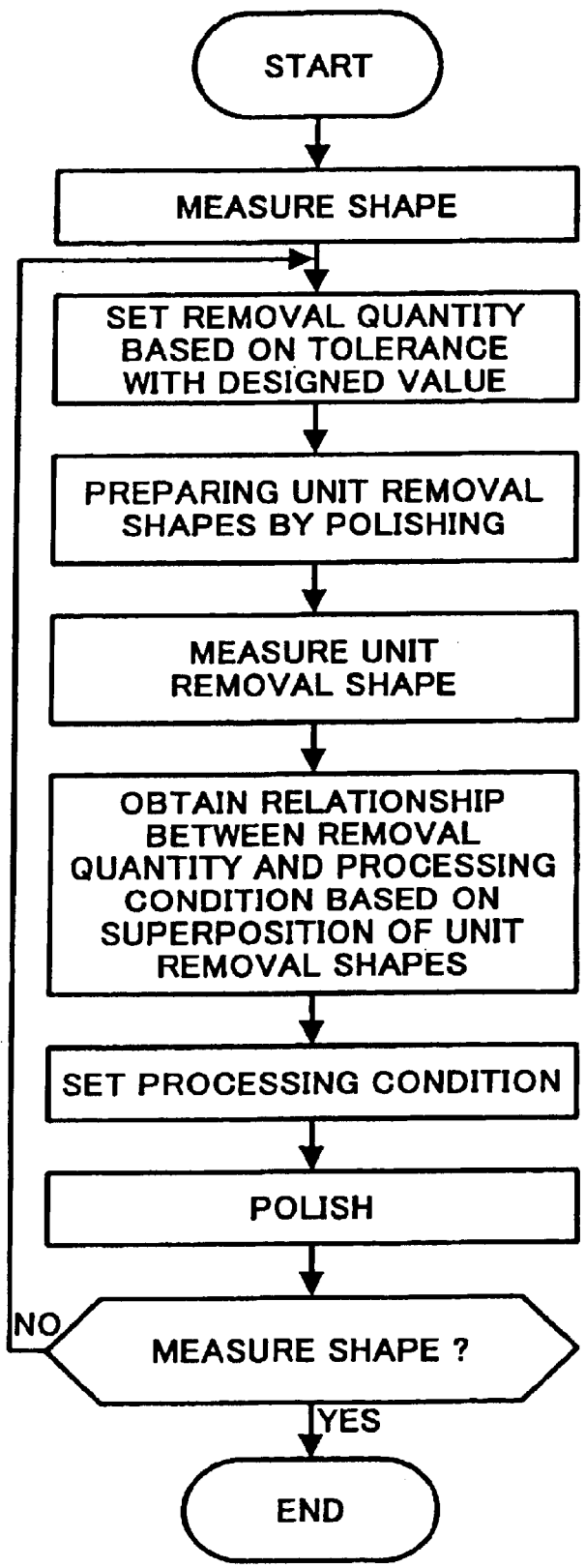
FIG. 14 is a flowchart of a related art for a flowchart of polishing control of Embodiment 1 in FIG. 17.
Figure 17:
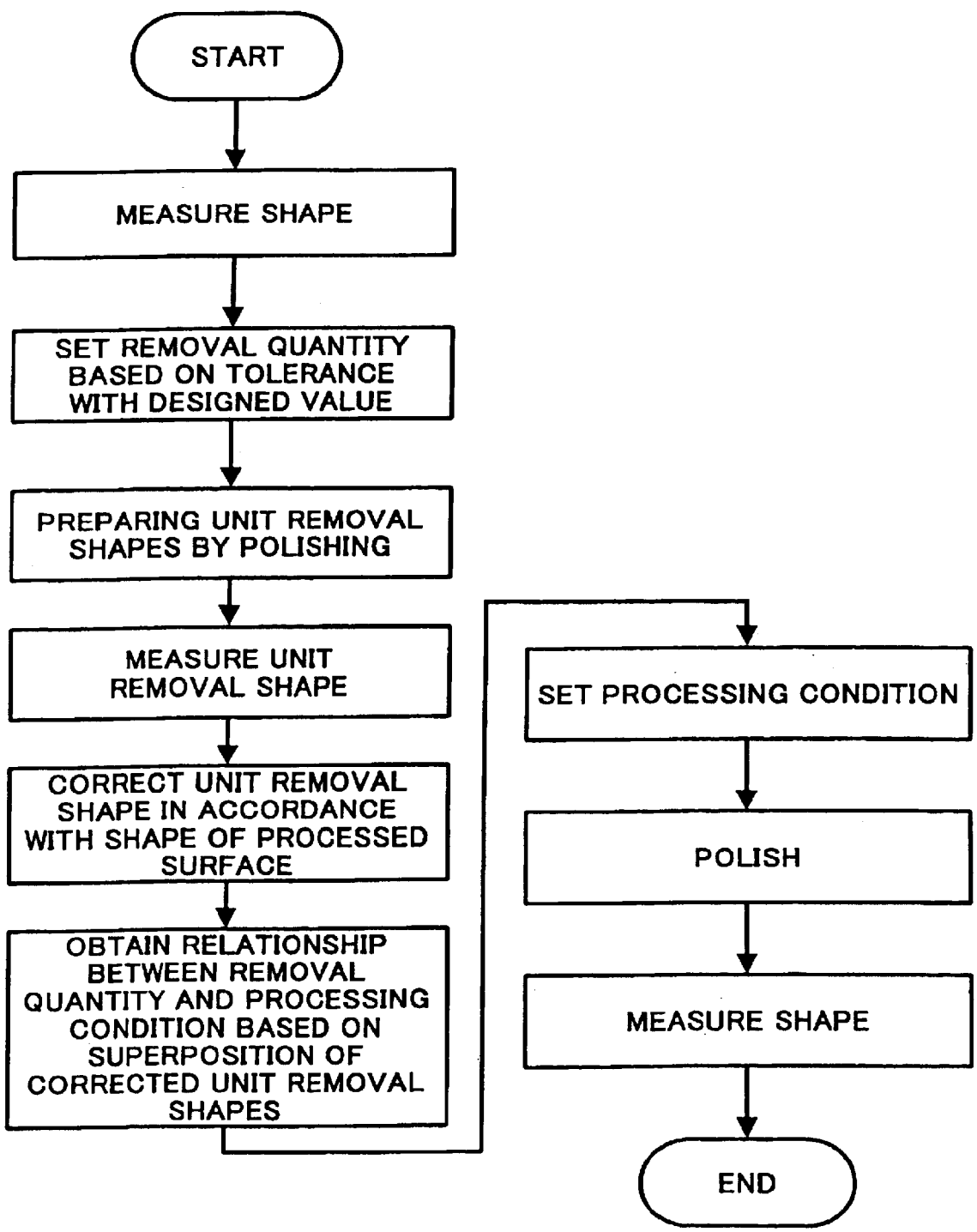
FIG. 17 is a flowchart of the polishing control of Embodiment 1.

A flowchart of Embodiment 1 is shown in FIG. 17, and a flowchart of the related art corresponding thereto is shown in FIG. 14. In Embodiment 1, high-precision processing can be realized, and the processing is terminated in one cycle of measurement, polishing and measurement. However, it is not always necessary to terminate the processing in one cycle of the steps.

The above Embodiment 1 can be applied also when processing a rotationally symmetric convex aspheric surface of an approximate curvature radius of 50 mm. However, it is necessary to adjust Embodiment 1 in accordance with degrees of an aspheric surface quantity and the target precision of the processed surface.

(Embodiment 2)

Figure 6:
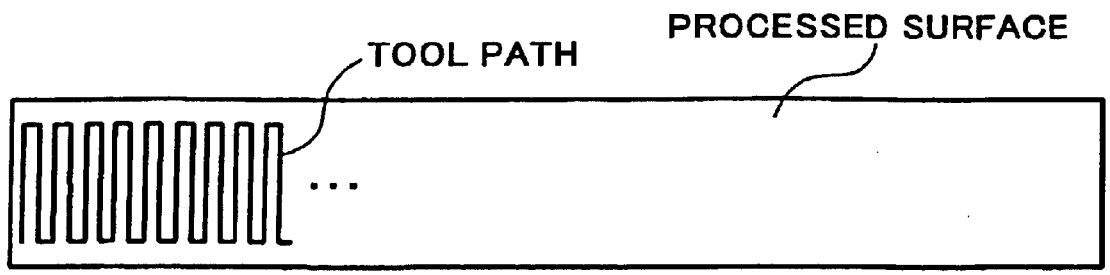
FIG. 6 is a development view showing a tool path for a metal mold for molding a long-scale optical device of Embodiment 2.
Figure 7:
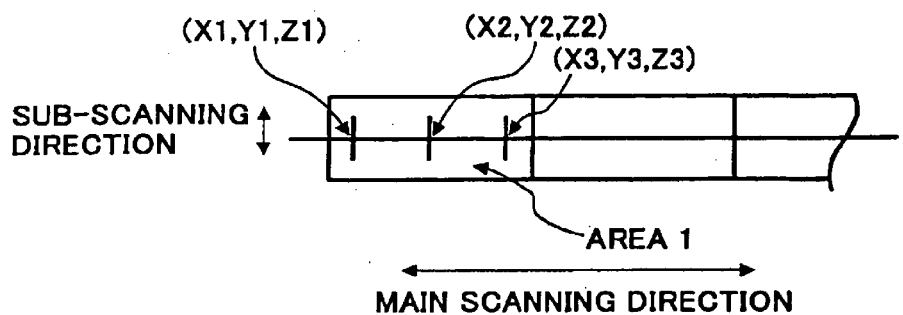
FIG. 7 is a view schematically showing coordinate positions of three points arrayed on a main bus-bar in an area 1 when curvature radii with respect to two directions of main and sub scanning directions perpendicular to each other for an area divided into 40 sections in the main scanning direction are obtained by use of a computer.
Figure 8:
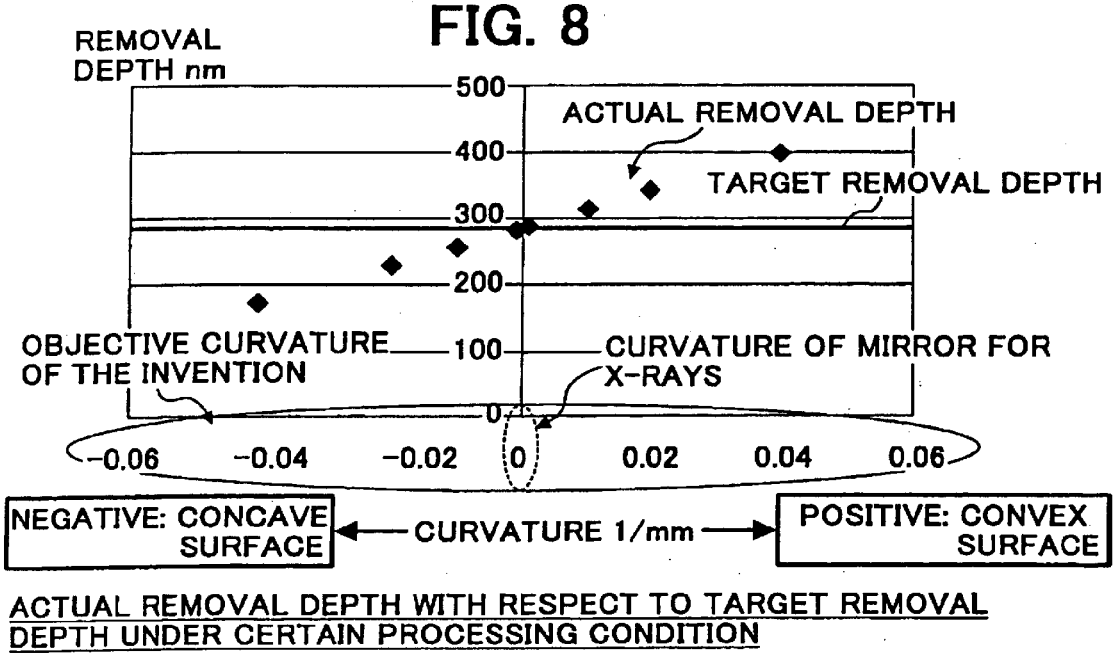
FIG. 8 is a graph showing a relationship of an actual removal depth to a target removal depth.

FIG. 6 shows a metal mold for molding a long-scale optical device. In this case, processing is performed on a tool path as illustrated. The worked surface is a free curved surface, where the curvature radius is changed depending on a position of the worked surface. There is a processed area having a length of about 200 mm in the main scanning direction and a length of about 3 mm in the sub-scanning direction. The curvature radii with respect to two directions of the main and sub scanning directions perpendicular to each other for an area divided into 40 sections in the main scanning direction are obtained by use of a computer. Here, coordinates of three points arrayed on a main bus-bar in an area 1 shown in FIG. 7 are first calculated by use of the following design equations.

$$(X1-a)^2+(Z1-b)^2=R^2 \quad \text{Equation (1)}$$

$$(X2-a)^2+(Z2-b)^2=R^2 \quad \text{Equation (2)}$$

$$(X3-a)^2+(Z3-b)^2=R^2 \quad \text{Equation (3)}$$

where a and b are constants, R is a curvature radius, $$b=\{(X1+X2)(X2-X3)(X1-X2)+(Z1+Z2)(Z1-Z2)(X2-X3)$$
$$-(X1-X2)(X2+X3)(X2-X3)-(X1-X2)(Z2+Z3)(Z2-Z3)\}$$
$$/\{2(Z1X2-Z1X3+Z2X3-Z2X1+Z3X1-Z3X2)\} \quad \text{Equation (4)}$$

$$a=\{2b(-Z1+Z2)+(X1+X2)(X1-X2)+(Z1+Z2)(Z1-Z2)\}/\{2(X1-X2)\} \quad \text{Equation (5)}$$

As shown in FIG. 7, when (X1, Y1, Z1), (X2, Y2, Z2) and (X3, Y3, Z3) are the coordinates of the three points, a curvature radius of a circle passing through these three points is obtained by use of Equations (1), (2) and (3). These three points are points apart from a left end of the area 1 by 0.5 mm, 2.5 mm and 4.5 mm, respectively. By use of Equations (1), (2) and (3), the curvature radius R is obtained. Then, b is obtained by use of Equation (4), and a is obtained by substituting a value of b into Equation (5). Then, the curvature radius R is obtained by substituting the values of a and b into Equation (1). Furthermore, determination is made as to whether the measured curved surface is a convex surface or a concave surface based on a positional relationship among the three points. Here, the curvature radius in the main scanning direction is obtained using the three points. However, the most fittable curvature radius may be obtained using points more than three by the least squared method. Moreover, a curvature radius in the sub-scanning direction, which passes through the point (X2, Y2, Z2), is obtained by use of a design equation. Thereafter, in a manner similar to Embodiment 1, the unit removal shape is corrected with regard to the main scanning direction and the sub-scanning direction. Regarding the corrected unit removal shape, two corrected removal shapes as shown in FIG. 3 are obtained with regard to the main and sub scanning directions. An average value thereof is adopted as the corrected unit removal shape. Also for other areas, the unit removal shapes are corrected in the similar manner. The unit removal depths of the unit removal shapes thus obtained are increased or decreased individually, followed by superposition thereof, and simulation is made so that a desired removal quantity can be obtained, and then, the stay periods are set in response to the quantities increased or decreased individually. Besides the stay period, the tool peripheral velocity and the load can be also changed. Here, the "desired removal quantity" is a tolerance between the desired designed shape and the result of measuring the shape of the worked surface before the polishing as shown in FIG. 2. Since a width in which the tool contacts the worked surface is 0.7 mm, the desired removal quantity is mentioned for a tolerance having a wavelength of 0.7 mm or more.

Figure 16:
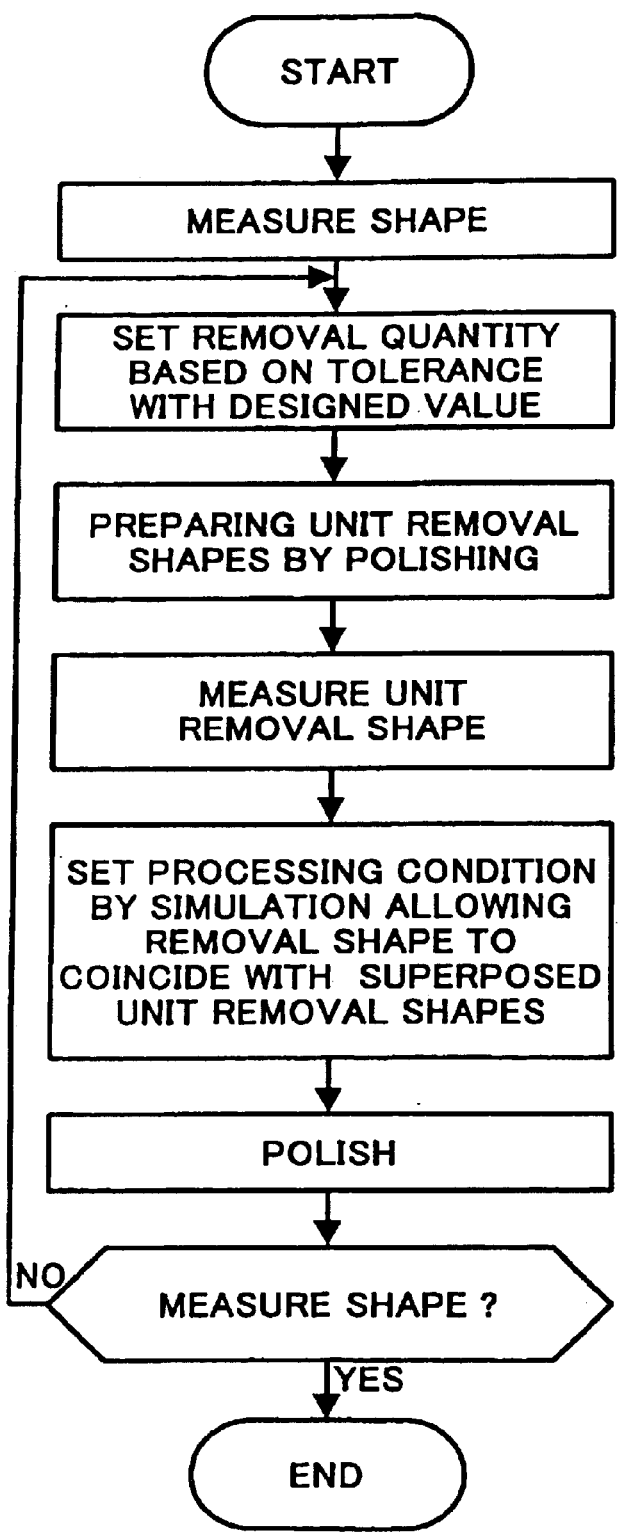
FIG. 16 is a flowchart of a related art for a flowchart of polishing control of Embodiment 2 in FIG. 19.
Figure 19:
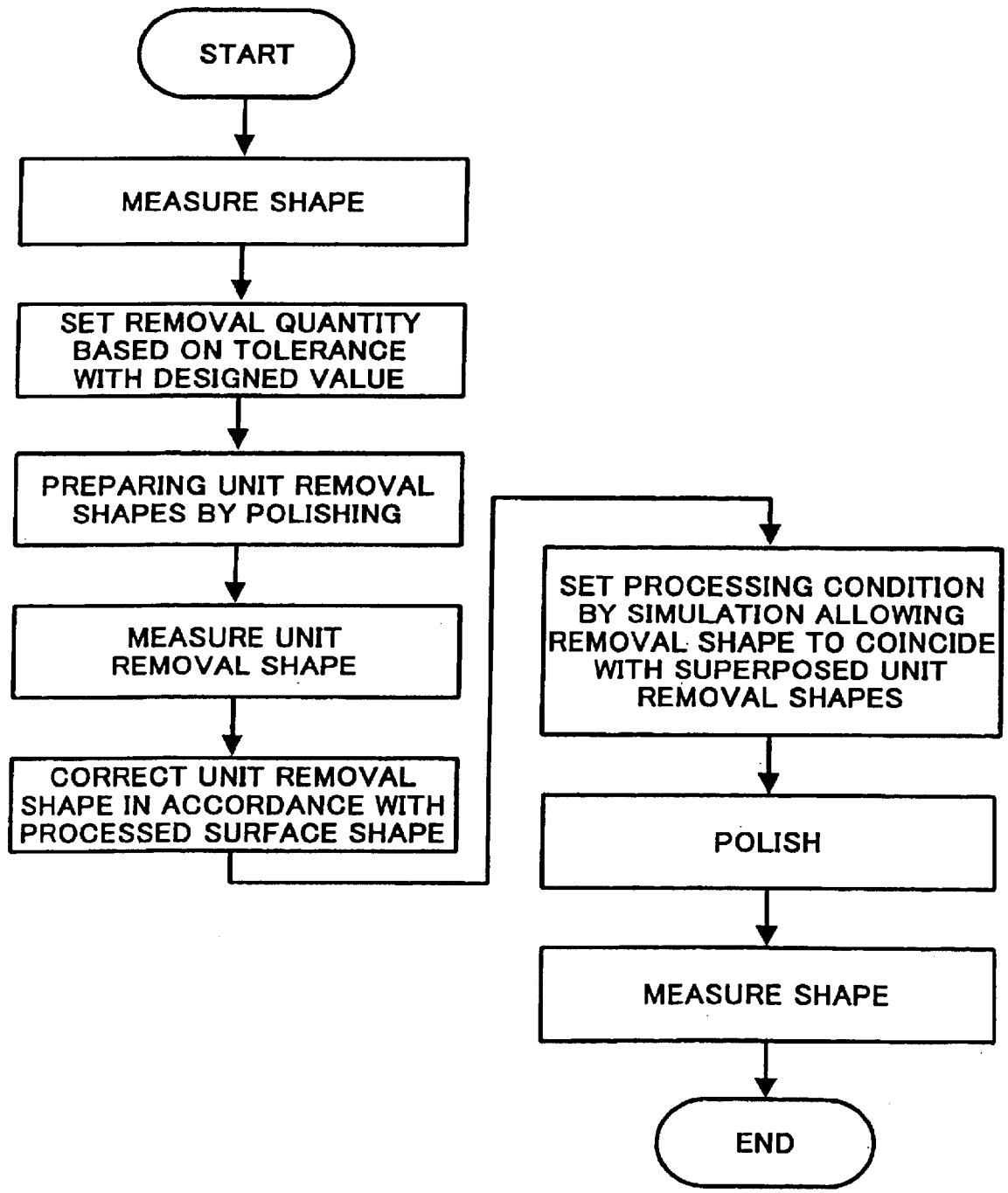
FIG. 19 is a flowchart of the polishing control of Embodiment 2.

A flowchart of Embodiment 2 is shown in FIG. 19, and a flowchart of the related art corresponding thereto is shown in FIG. 16. In Embodiment 2, high-precision processing can be realized, and the processing is terminated in one cycle of measurement, polishing and measurement.

(Embodiment 3)

FIG. 6 shows the metal mold for molding the long-scale optical device. In this case, processing is performed on the tool path as illustrated. The processed surface is a free curved surface, where the curvature radius is changed depending on a position of the worked surface. There is a processed area having a length of about 200 mm in the main scanning direction and a length of about 3 mm in the sub-scanning direction. Simulation is carried out in such a manner that the curvature radii with respect to the two directions of the main and sub scanning directions perpendicular to each other for the area divided into 40 sections in the main scanning direction are obtained by use of a computer. Here, the coordinates of three points arrayed on the main bus-bar in the area 1 shown in FIG. 7 are first calculated by use of the design equations. As shown in FIG. 7, when (X1, Y1, Z1), (X2, Y2, Z2) and (X3, Y3, Z3) are the coordinates of the three points, the curvature radius of the circle passing through these three points is obtained by use of Equations (1), (2) and (3). These three points are points apart from the left end of the area 1 by 0.5 mm, 2.5 mm and 4.5 mm, respectively. By use of Equations (1), (2) and (3), the curvature radius R is obtained b is obtained by use of Equation (4), and a is obtained by substituting a value of b into Equation (5). Then, the curvature radius R is obtained by substituting the values of a and b into Equation (1). Furthermore, determination is made as to whether the measured curved surface is a convex surface or a concave surface based on the positional relationship among the three points. Moreover, the curvature radius in the sub-scanning direction, which passes through the point (X2, Y2, Z2), is obtained by use of a design equation. The corrected quantity of the unit removal shape is required more as the curvature radius is smaller. Therefore, correction of the unit removal shape is made for a smaller one of the curvature radii of the main and sub scanning directions. Also for other areas, the unit removal shapes are corrected in the similar manner. The unit removal depths of the unit removal shapes thus obtained are increased or decreased individually, followed by superposition thereof, and simulation is made so that a desired removal quantity can be obtained, and then, the stay periods are set in response to the quantities increased or decreased individually. Besides the stay period, the tool peripheral velocity and the load can be also changed. Here, the "desired removal quantity" is the tolerance between the desired designed shape and the result of measuring the shape of the worked surface before the polishing as shown in FIG. 2. Since the width in which the tool contacts the worked surface is 0.7 mm, the desired removal quantity is mentioned for the tolerance having the wavelength of 0.7 mm or more. The shape of the worked surface is measured to analyze a surge having a wavelength ranging from 0.7 mm to 7 mm. Consequently, a highly precise worked surface only with a surge having amplitude of 40 nm or less is obtained.

A flowchart of Embodiment 3 is shown in FIG. 19, and a flowchart of the related art corresponding thereto is shown in FIG. 16. In Embodiment 3, high-precision processing can be realized, and the processing is terminated in one cycle of measurement, polishing and measurement.

(Embodiment 4)

FIG. 6 shows the metal mold for molding the long-scale optical device. In this embodiment, a material of the processed matter is stainless steel. The processing is performed on the tool path as illustrated. The worked surface is a free curved surface, where the curvature radius is changed depending on a position of the worked surface. There is a processed area having a length of about 150 mm in the main scanning direction and a length of about 3 mm in the sub-scanning direction.

Prior to the processing, a plane formed of the same material as that of the worked surface of the metal mold is processed, whereby the processing condition is determined based thereon.

$$\delta = 200 \times t$$

($\delta$: removal depth (nm), t: stay period (sec/mm)).

The above is the relationship between the removal depth and the stay period in the plane. Here, it is assumed that the tool peripheral velocity and the load are constant, which are 20 mm/sec and 100 gf, respectively.

Figure 11:
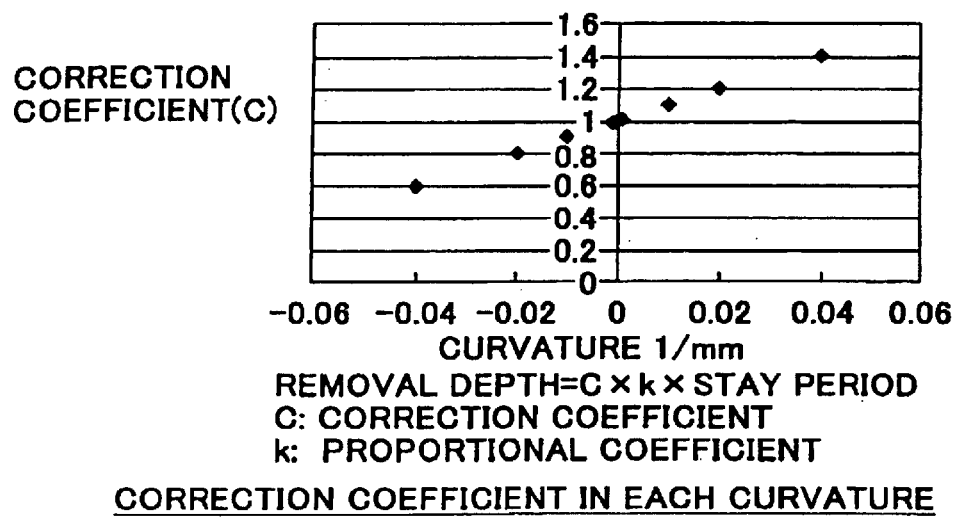
FIG. 11 is a graph showing a relationship between each curvature of the worked surface and a correction coefficient when the removal depth is obtained by a function of a stay period.

Moreover, changes of the removal depths with respect to the curvature radius under the same processing conditions where the tool peripheral velocity is 20 mm/sec and the load is 100 gf when the stay period is 0.6 sec/mm are obtained from a processing experiment. Based on a result thereof, a correction coefficient C is obtained (FIG. 11). With regard to the correction coefficient C, a relationship in the following equation is established as also shown in FIG. 11.

$$\delta = C \times k \times t$$

($\delta$: removal depth (nm), C: correction coefficient, k: proportional constant (200 in this embodiment), t: stay period (sec/mm)).

As shown in FIG. 2, the removal depth of each processed point is obtained based on the tolerance between the desired designed shape and the result of measuring the shape of the worked surface before the polishing. Moreover, as shown in FIG. 7, the worked surface is divided in the main scanning direction in an interval of 10 mm, and a curvature radius, that is, so-called a partial curvature radius is obtained based on the result of measuring the shape of each divisional area before the polishing. Based on the removal depth, the correction coefficient and the proportional constant in each processed point, the stay period as a processing condition can be obtained, and according to this condition, the processing machine is controlled, and thus the high-precision polishing is executed.

Since the width in which the tool contacts the worked surface is 1 mm, a tolerance having a wavelength of 1 mm or more is set as an object to be treated. Consequently, when the result of measuring the processed shape is analyzed for a surge having a wavelength ranging from 1 mm to 10 mm, a highly precise worked surface only with a surge having amplitude of 30 nm or less is obtained.

Figure 15:
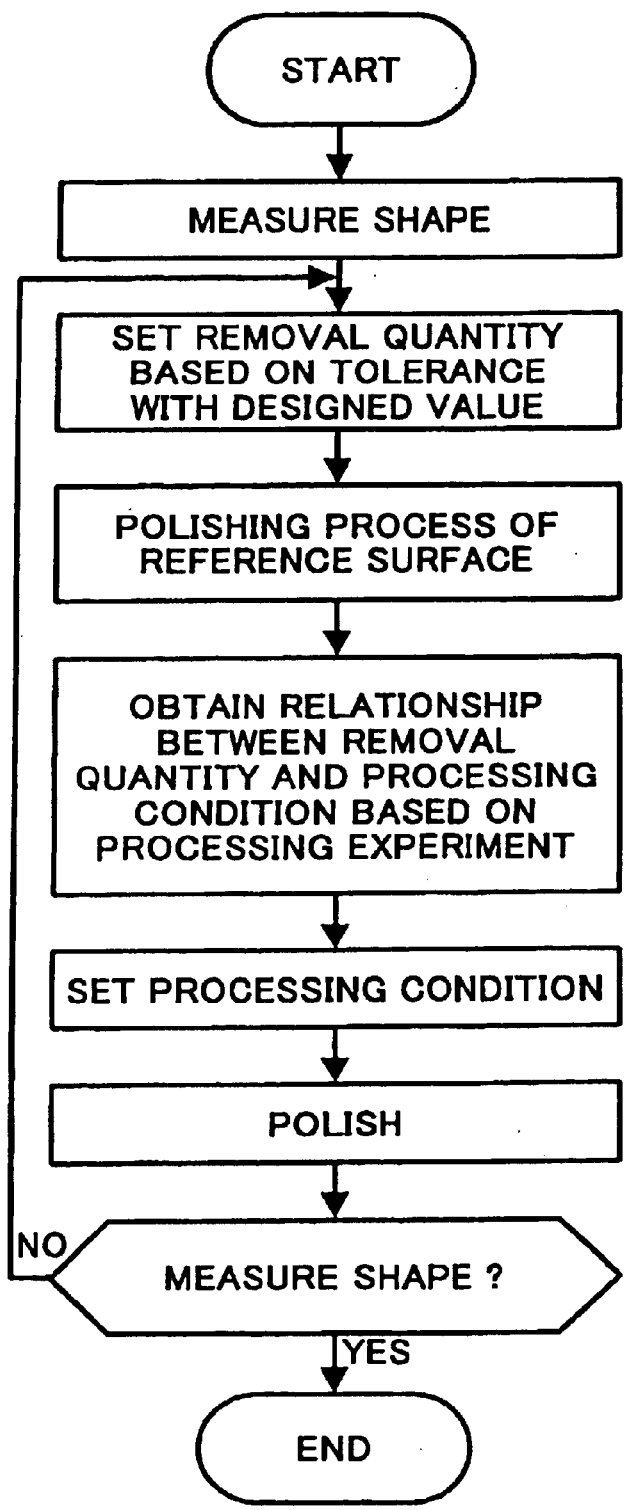
FIG. 15 is a flowchart of a related art for a flowchart of polishing control of Embodiment 4 in FIG. 18.
Figure 18:
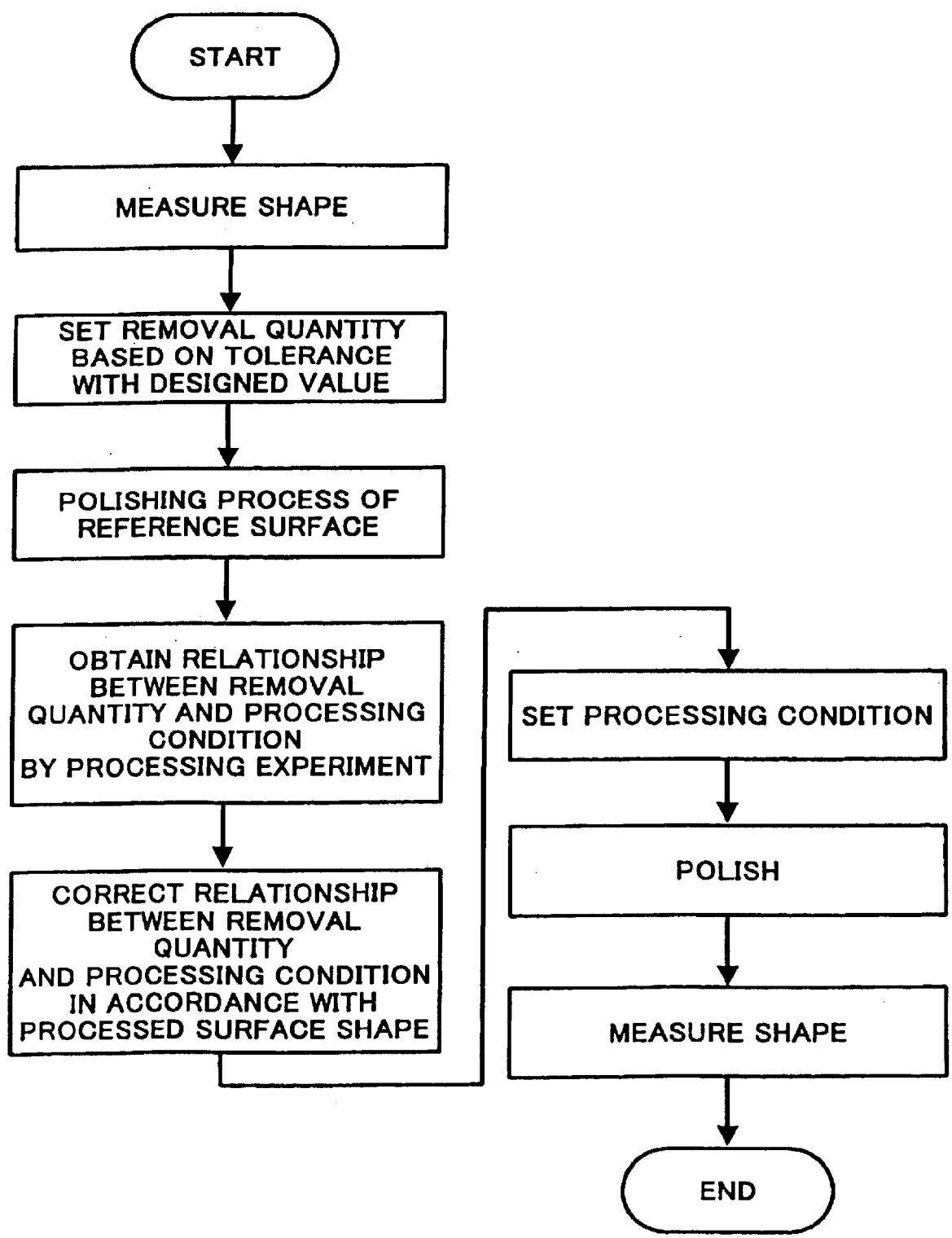
FIG. 18 is a flowchart of the polishing control of Embodiment 4.

A flowchart of Embodiment 4 is shown in FIG. 18, and a flowchart of the related art corresponding thereto is shown in FIG. 15. In Embodiment 4, high-precision processing can be realized, and the processing is terminated in one cycle of measurement, polishing and measurement.

(Embodiment 5)

FIG. 6 shows the metal mold for molding the long-scale optical device. In this embodiment, a material of the worked matter is the one obtained by subjecting a stainless steel to non-electrolytic nickel plating. The processing is performed on the tool path as illustrated.

The processed surface is a free curved surface, where the curvature radius is changed depending on a position of the worked surface. There is a processed area having a length of about 170 mm in the main scanning direction and a length of about 5 mm in the sub-scanning direction. This is a metal mold having a concave shape where the curvature radius in the sub-scanning direction is continuously changed from 30 mm to 85 mm depending on spots.

Prior to the polishing processing, processing is made for a concave cylinder surface formed of the same material as that of the processed surface of the metal mold, the concave cylinder having a curvature radius of 50 mm, whereby the unit removal shape is obtained. Simulation of superposing the unit removal shapes is carried out, whereby the processing condition is determined based thereon.

$$\delta = 300 \times t$$

($\delta$: removal depth (nm), t: stay period (sec/mm)).

The above is the relationship between the removal depth and the stay period in the reference surface. Here, it is assumed that the tool peripheral velocity and the load are constant, which are 300 mm/sec and 150 gf, respectively.

Figure 12:
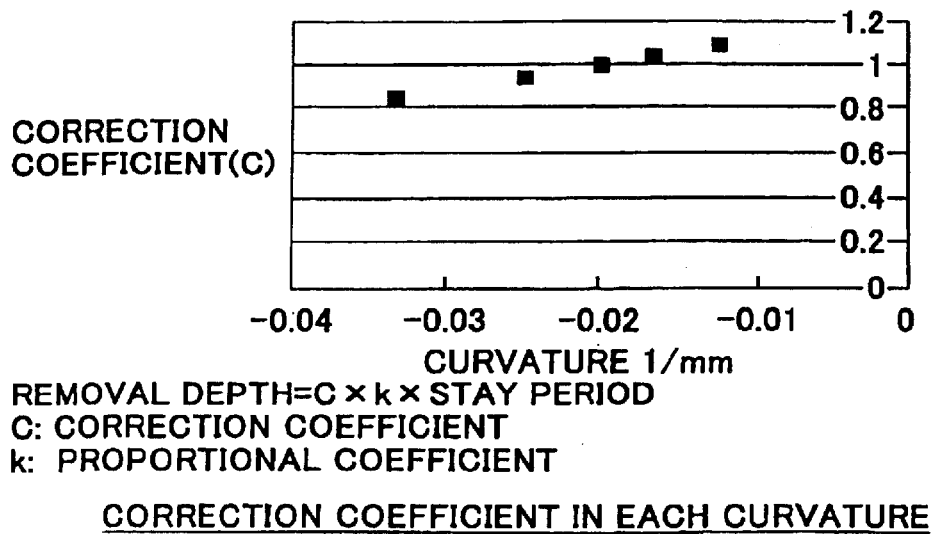
FIG. 12 is a graph showing the relationship between each curvature of the worked surface and the correction coefficient similarly to FIG. 11.

Moreover, the unit removal shapes on the concave cylinder surfaces, each having a curvature radius selected from 30 mm, 40 mm, 60 mm and 80 mm, under the same processing conditions where the tool peripheral velocity is 300 mm/sec and the load is 150 gf when the stay period is 0.6 sec/mm are obtained from a processing experiment. The simulation for superposing the unit removal shapes is carried out, whereby the removal depths in the respective curvature radii are obtained. Based on a result thereof, a correction coefficient C is obtained (FIG. 12). FIG. 12 shows a relationship between the correction coefficient and a curvature as an inverse number of the curvature radius taken as an axis of abscissas, where the concave surface is defined as negative. Here, since the concave cylinder surface having the curvature radius of 50 mm is taken as the reference surface, the correction coefficient becomes 1 when the curvature is −0.02/mm. With regard to the correction coefficient C, a relationship in the following equation is established as also shown in FIG. 12.

$$\delta = C \times k \times t$$

($\delta$: removal depth (nm), C: correction coefficient, k: proportional constant (300 in this embodiment), t: stay period (sec/mm)).

As shown in FIG. 2, the removal depth of each processed point is obtained based on the tolerance between the desired designed shape and the result of measuring the shape of the worked surface before the polishing. Moreover, the processed surface is divided in the main scanning direction in an interval of 1 mm, and an approximate curvature radius in the sub-scanning direction is obtained based on the result of measuring the shape of each divisional area before the polishing. Based on the removal depth, the correction coefficient and the proportional constant in each processed point, the stay period as a processing condition can be obtained, and according to this condition, the processing machine is controlled, and thus the high-precision polishing is executed. Since the width in which the tool contacts the worked surface is 1 mm, the tolerance having a wavelength of 1 mm or more is set as an object to be treated. Consequently, when the result of measuring the processed shape is analyzed for a surge having a wavelength ranging from 1 mm to 10 mm, a highly precise worked surface only with a surge having amplitude of 30 nm or less is obtained.

A flowchart of Embodiment 5 is shown in FIG. 18, and a flowchart of the related art corresponding thereto is shown in FIG. 15. In Embodiment 5, high-precision processing can be realized, and the processing is terminated in one cycle of measurement, polishing and measurement.

(Embodiment 6)

Figure 13:
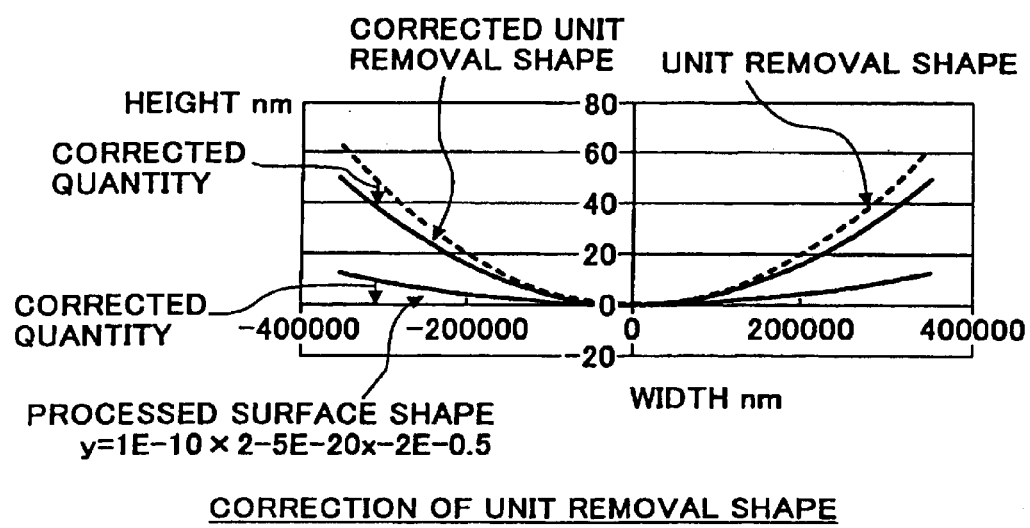
FIG. 13 is a graph of an example of correcting the unit removal shapes based on one example of the shapes of the worked surface in the sub-scanning direction and the unit removal shape in a reference surface (here, a plane).

FIG. 6 shows the metal mold for molding the optical device. The processing is performed on the tool path as illustrated. The worked surface is a free curved surface. When the approximate curvature radii of the respective shapes in the main and sub scanning directions are compared with each other, the approximate curvature radius of the shape in the sub-scanning direction is smaller. Therefore, the correction is made based on the shape in the sub-scanning direction. FIG. 13 shows an example where the unit removal shape is corrected based on one example of the shape of the worked surface in the sub-scanning direction and the unit removal shape on the reference surface (here, a plane). In this example, the shape of the worked surface obtained by measuring the worked surface is made approximate to the following polynomial.

$$Y=(1E-10)X2-(5E-20)X2-5$$

The unit removal shape is deformed in the normal line direction on the vertex when the above-described worked surface is deformed to a plane as the reference surface, that is, in the same direction as a vertical direction of a moving quantity in FIG. 13 and by the same quantity as the moving quantity. Thus, the corrected unit removal shapes are obtained. By superposing the corrected unit removal shapes, the corrected quantity in the shape of the worked surface is obtained, and the stay period is decided. Since the width in which the tool contacts the worked surface is 1 mm, the stay period on each processed point is set with the tolerance having a wavelength of 1 mm or more taken as an object, and then the polishing is executed. Consequently, when the result of measuring the processed shape is analyzed for a surge having a wavelength ranging from 1 mm to 10 mm, a highly precise worked surface only with a surge having amplitude of 30 nm or less is obtained.

A flowchart of Embodiment 6 is shown in FIG. 17, and a flowchart of the related art corresponding thereto is shown in FIG. 14. In Embodiment 6, high-precision processing can be realized, and the processing is terminated in one cycle of measurement, polishing and measurement.

A high-precision optical device is molded by use of a metal mold processed as described above, from which the tolerance such as a surge is removed. By means of a printing processing apparatus having the optical device mounted thereon, high-speed and high-definition printing is enabled.

Effects of the present invention described above will be summarized as below.

(1) In processing of the curved surface by applying the load between the tool and the worked surface, prior to processing the worked surface, the reference surface of the same material as that of the worked surface is processed to previously grasp the relationship between the processing condition and the removal quantity or the removal depth, and in accordance with the shape of the worked surface the relationship between the processing condition and the removal quantity or the removal depth in the reference surface is corrected, then the worked surface is processed. Therefore, in the polishing processing, desired removal quantity or removal depth can be obtained irrespective of the shape of the worked surface, thus making it possible to realize the high-precision processing. Since the high-precision processing can be realized, it is not necessary to iterate the steps of measuring the shape, polishing the surface and measuring the shape, and the polishing finish is completed in one polishing processing. The high-precision worked surface is obtained for a short time without iterating the polishing processing, and the obtained worked surface has a surge of several ten nm or less in precision.

(2) The reference surface is one or more of a plane, a spherical surface and a cylinder surface. Therefore, by forming the reference surface into a simple shape, acquisition of data thereof is facilitated, and correction of the unit removal quantity is also facilitated, thus making it possible to readily obtain the relationship between the processing condition and the removal quantity or the removal depth, and possible to execute the correction of the relationship between the processing condition and the removal quantity or the removal depth and the correction of the unit removal shapes for a short time.

(3) As the shape of the processed surface, the cross-section of the processed surface is indicated by the approximate curvature radius. Therefore, the relationship between the processing condition and the removal quantity or the removal depth in the plane is corrected in accordance with the approximate curvature radius, whereby the high-precision processing can be realized.

(4) As the shape of the processed surface, the cross-section of the processed surface is indicated by an approximate polynomial. Therefore, the relationship between the processing condition and the removal quantity or the removal depth in the plane is corrected in accordance with the approximate polynomial, whereby the high-precision processing can be realized.

(5) The shape of the processed surface is a shape of a partial processed surface in each area obtained by dividing the worked surface in a desired interval. Therefore, in the free curved surface where the approximate curvature radius or the approximate polynomial of the worked surface changes depending on the processed area, the relationship between the processing condition and the removal quantity or the removal depth in the reference surface can be corrected in accordance with the shape of the partial worked surface of each area, whereby the high-precision processing can be realized also in the free curved surface.

(6) The shape of the processed surface is obtained based on measurement data of the shape of the worked surface, which is measured prior to polishing the shape of the worked surface. Alternatively, the shape of the worked surface is obtained based on a predetermined design value. Therefore, the shape of the worked surface for correcting the relationship between the processing condition and the removal quantity or the removal depth can be obtained, thus making it possible to execute the correction in each worked surface.

(7) The processing condition is a condition capable of changing the removal quantity or the removal depth. Therefore, the removal quantity or the removal depth can be changed by the processing condition in accordance with the necessary removal depth, whereby the high-precision processing regarding the shape or the surge can be realized.

(8) The condition capable of changing the removal quantity or the removal depth is at least one condition of the stay period, the tool peripheral velocity and the load. Therefore, the removal quantity or the removal depth can be changed readily, whereby the high-precision processing regarding the shape or the surge can be realized.

(9) The reference surface of the same material as that of the worked surface is processed prior to processing the worked surface to obtain the unit removal shapes in the reference surface, and the unit removal shapes in the reference surface are corrected in accordance with the shape of the worked surface, then simulation of superposing the corrected unit removal shapes is carried out. Therefore, the relationship between the processing condition and the removal quantity or the removal depth can be corrected in accordance with the shape of the worked surface, thus making it possible to accurately correct the relationship between the processing condition and the removal quantity or the removal depth by the minimum processing experiment in accordance with the shape of the worked surface. Moreover, a processing experiment for acquiring data of the unit removal shape corresponding to each worked surface shape is not performed to reduce a period, electric power, a ground material, abrasive grains, lubrication oil and the like, which are required in the case of performing the experiment, thus making it possible to decrease an environmental load.

(10) The reference surface of the same material as that of the worked surface is processed prior to processing the worked surface to obtain the unit removal shapes in the reference surface, and the unit removal shapes in the reference surface are corrected in accordance with the shape of the worked surface, then simulation of superposing the corrected unit removal shapes is carried out. Therefore, the processing condition is calculated, thus making it possible to accurately calculate the processing condition in accordance with the shape of the worked surface by the minimum processing experiment. Moreover, the processing experiment for acquiring the data of the unit removal shape corresponding to each worked surface shape is not performed to reduce the period, the electric power, the ground material, the abrasive grains, the lubrication oil and the like, which are required in the case of performing the experiment, thus making it possible to decrease the environmental load.

(11) The shapes of the worked surface are obtained in two directions perpendicular to each other, and the obtained shapes are corrected. Therefore, the correction in accordance with the worked surface can be simply performed.

(12) The shapes of the worked surface are obtained in the two directions perpendicular to each other, and one of the obtained shapes having a smaller curvature radius is corrected. Therefore, the correction in accordance with the shape of the worked surface is performed for the shape having the smaller curvature radius, which affects the removal depth more, whereby the correction can be performed simply and effectively.

(13) When the worked surface is deformed to the same shape as that of the reference surface, the unit removal shapes in the reference surface are deformed in the same direction as a normal line direction on a vertex of the worked surface and by the same distance as a moving distance thereof in the normal line direction to correct the unit removal shapes. Therefore, it is made possible to obtain the unit removal shape in each worked surface by calculation. Moreover, the processing experiment for acquiring the data of the unit removal shape corresponding to each worked surface shape is not performed to reduce the period, the electric power, the ground material, the abrasive grains, the lubrication oil and the like, which are required in the case of performing the experiment, thus making it possible to decrease the environmental load.

(14) The shape of the processed surface is the shape of the partial worked surface in each area obtained by dividing the worked surface in a desired interval. Therefore, it is made possible to obtain the unit removal shape in each worked surface by the processing experiment, and more accurate unit removal shapes can be obtained for a ground material subjected to the processing little.

(15) There is provided a program allowing a computer to function as means for calculating the shape of the worked surface, means for correcting the unit removal shapes based on the calculated shape and means for superposing the corrected unit removal shapes to simulate the relationship between the processing condition and the removal quantity or the removal depth in accordance with the worked surface. Alternatively, there is provided a storage medium, in which the program is stored. Therefore, it is made possible to calculate the relationship between the processing condition and the removal quantity or the removal depth in accordance with the worked surface automatically and rapidly, whereby it is made possible to set the processing condition in each processed point, and the high-precision processing can be realized.

(16) There is provided a program allowing a computer to function as means for calculating the shape of the worked surface, means for correcting the unit removal shapes based on the calculated shape and means for superposing the corrected unit removal shapes to perform simulation for calculating the processing condition. Alternatively, there is provided a storage medium, in which the program is stored. Therefore, it is made possible to calculate the processing condition in accordance with the worked surface automatically and rapidly. Furthermore, the processing can be executed under the processing condition, and the high-precision processing can be realized.

(17) There is provided the curved surface processing method, in which a surge having a wavelength of a contact width of the tool to the worked surface or larger is removed by controlling the processing condition. Alternatively, there is provided a curved surface processing apparatus, in which a surge having a wavelength of a contact width of the tool to the worked surface or larger is removed by controlling the processing condition. Therefore, it is made possible to positively remove the surge having the wavelength of the contact width of the tool to the worked surface, which cannot be removed in processing for obtaining an even removal depth, whereby surge precision in a desired wavelength range can be improved.

(18) There is provided processed matter processed by means of a curved surface processing method. Therefore, the processed matter is the one from which the tolerance for the designed shape is removed, and it is possible to realize a desired optical function.

(19) The processed matter is a metal mold for molding an optical device. Therefore, it is possible to obtain a metal mold for molding an optical device, from which the tolerance for the designed shape is removed, whereby a high-performance optical device can be obtained.

(20) There is provided an optical device molded by use of the metal mold for an optical device. Therefore, the high-performance optical device can be obtained, thus making it possible to obtain a high-performance printing processing apparatus.

Note that, when mounting the optical device as an optical device of the printing processing apparatus, since the optical device has extremely high performance, high-speed and high-definition printing for characters and images can be made.

What is claimed is:

1. A computer-implemented method for processing a worked surface of a work piece, comprising:
    processing a reference surface of a same material as a material of said work piece prior to processing said worked surface;
    determining a processing condition based on a removal quantity or removal depth of the material obtained by the processing of the reference surface;
    correcting the processing condition based on a desired shape of the worked surface of the work piece; and processing said worked surface of the work piece based on correction of said processing condition.

2. The computer-implemented method for processing a worked surface of a work piece according to claim 1, wherein the reference surface includes one or more of a plane, a spherical surface and a cylindrical surface.

3. The computer-implemented method for processing a worked surface of a work piece according to claim 1, further comprising:
obtaining the desired shape of the worked surface by determining a cross-section of the worked surface based on an approximate curvature radius.

4. The computer-implemented method for processing a worked surface of a work piece according to claim 1, further comprising:
obtaining the desired shape of the worked surface by calculating a cross-section of the worked surface based on an approximate polynomial.

5. The computer-implemented method for processing a worked surface of a work piece according to claim 1, further comprising:
connecting partial areas obtained by dividing the worked surface in a desired interval to determine the desired share of the worked surface.

6. The computer-implemented method for processing a worked surface of a work piece according to claim 1, further comprising:
obtaining the desired shape of the worked surface based on measurement data of the shape of the worked surface, the measurement data being measured prior to polishing the shape of the worked surface.

7. The computer-implemented method for processing a worked surface of a work piece according to claim 1, further comprising:
obtaining the desired shape of the worked surface based on a predetermined design value.

8. The computer-implemented method for processing a worked surface of a work piece according to claim 1, wherein the processing condition includes at least one of the removal quantity and the removal depth.

9. The computer-implemented method for processing a worked surface of a work piece according to claim 8, wherein the processing condition includes at least one of a stay period, a tool peripheral velocity, and a load.

10. The computer-implemented method for processing a worked surface of a work piece according to claim 1, wherein the reference surface of the same material as the material of the worked surface is processed prior to processing the worked surface to obtain unit removal shapes in the reference surface, and the unit removal shapes in the reference surface are corrected based on the desired shape of the worked surface, then a simulation superposing the corrected unit removal shapes is carried out to correct the processing condition based on the desired shape of the worked surface.

11. The computer-implemented method for processing a worked surface of a work piece according to claim 1, wherein the reference surface of the same material as the material of the worked surface is processed prior to processing the worked surface to obtain unit removal shapes in the reference surface, and the unit removal shapes in the reference surface are corrected based on the desired shape of the worked surface, then a simulation of superposing the corrected unit removal shapes is carried out to determine the processing condition.

12. The computer-implemented method for processing a worked surface of a work piece according to claim 1, further comprising:
obtaining the shapes of the worked surface in two directions perpendicular to each other; and
correcting the shapes.

13. The computer-implemented method for processing a worked surface of a work piece according to claim 1, further comprising:
obtaining the shapes of the worked surface in two directions perpendicular to each other; and
correcting one of the shapes having a smaller curvature radius.

14. The computer-implemented method for processing a worked surface of a work piece according to claim 11, further comprising:
deforming the unit removal shapes in the reference surface in a same direction as a normal line direction on a vertex of the worked surface and by a same distance as a moving distance thereof in the normal line direction to correct the unit removal shapes, when the worked surface is deformed to a same shape as a shape of the reference surface.

15. The computer-implemented method for processing a worked surface of a work piece according to claim 11, further comprising:
obtaining the unit removal shapes by processing a worked surface of same shape and material as the shape and the material of the worked surface to be processed.

16. The computer-implemented method for processing a worked surface of a work piece according to claim 11, wherein a computer storing a program is configured to calculate the desired shape of the worked surface, correct the unit removal shapes based on the desired shapes, and superimpose the corrected unit removal shapes to determine the processing condition and any of the removal quantity and the removal depth based on the desired shape of the worked surface.

17. The computer-implemented method for processing a worked surface of a work piece according to claim 11, wherein a computer is configured to calculate the desired shape of the worked surface, correct the unit removal shapes based on the desired shape, and superimpose the corrected unit removal shapes to determine the processing condition and any of the removal quantity and the removal depth based on the desired shape of the worked surface.

18. The computer-implemented method for processing a worked surface of a work piece according to claim 12, wherein a computer is configured to calculate the desired shape of the worked surface, correct the unit removal shapes based on the desired shape, and superimpose the corrected unit removal shapes to determine the processing condition.

19. The computer-implemented method for processing a worked surface of a work piece according to claim 12, wherein a computer storing a program is configured to calculate the desired shape of the worked surface, correct the unit removal shapes based on the desired shape, and superimpose the corrected unit removal shapes to determine the processing condition.

20. The computer-implemented method for processing a worked surface of a work piece according to claim 2, further comprising:
removing a surge having a wavelength of a contact width of the tool to the worked surface or larger by controlling the processing condition.

21. A processed matter, wherein the processed matter is processed by the computer-implemented method for processing a worked surface of a work piece according to claim 1.

22. The processed matter according to claim 21, wherein the processed matter is a metal mold for molding an optical device.

23. An optical device, wherein the optical device is molded by use of the metal mold for an optical device of claim 22.

24. The computer-implemented method for processing a work surface of a work piece according to claim 1, wherein said worked surface of the work piece is processed by applying a load between a tool and the worked surface.

25. An automated computer apparatus for processing comprising:

means for processing a worked surface of a work piece;

means for processing a reference surface of the same material as that of the worked surface prior to processing the worked surface;

means for determining a processing condition based on a removal quantity or a removal depth obtained by processing of the reference surface; and means for correcting the processing condition based on a desired shape of the worked surface.

* * * * *